(12) United States Patent
Schonewille et al.

(10) Patent No.: US 12,550,827 B2
(45) Date of Patent: Feb. 17, 2026

(54) TOOL, DEVICE AND PROCEDURE FOR THE AUTOMATED SEPARATION OF A BRANCH

(71) Applicant: VDL ETG PROJECTS B.V., Eindhoven (NL)

(72) Inventors: Harrie Schonewille, Eindhoven (NL); Stefanus Joseph Poppelaars, Eindhoven (NL)

(73) Assignee: VDL ETG PROJECTS B.V., Eindhoven (NL)

( * ) Notice: Subject to any disclaimer, the term of this patent is extended or adjusted under 35 U.S.C. 154(b) by 493 days.

(21) Appl. No.: 18/006,964

(22) PCT Filed: Jul. 14, 2021

(86) PCT No.: PCT/NL2021/050443
§ 371 (c)(1),
(2) Date: Jan. 26, 2023

(87) PCT Pub. No.: WO2022/025758
PCT Pub. Date: Feb. 3, 2022

(65) Prior Publication Data
US 2023/0263101 A1    Aug. 24, 2023

(30) Foreign Application Priority Data
Jul. 29, 2020  (NL) .................................... 2026162

(51) Int. Cl.
*A01G 3/037* (2006.01)
*A01D 46/30* (2006.01)
*A01G 3/033* (2006.01)

(52) U.S. Cl.
CPC ............. *A01G 3/037* (2013.01); *A01D 46/30* (2013.01); *A01G 3/033* (2013.01)

(58) Field of Classification Search
CPC .......... A01G 3/037; A01G 3/033; A01G 3/00; A01G 3/02; A01G 3/04; B25J 5/007; A01D 46/30
See application file for complete search history.

(56) References Cited

U.S. PATENT DOCUMENTS

2011/0046785 A1    2/2011  Zeelen
2011/0053670 A1*   3/2011  Kneppers ............... A01D 46/00
                                                    460/134

(Continued)

FOREIGN PATENT DOCUMENTS

CN      210630239 U      5/2020
NL        2001479 C2    12/2009
WO    2018/167784 A1     9/2018

OTHER PUBLICATIONS

Patent Cooperation Treaty, International Search Report, Application No. PCT/NL2021/050443, dated Aug. 31, 2021, in 2 pages.

*Primary Examiner* — Brad Harcourt
(74) *Attorney, Agent, or Firm* — Procopio, Cory, Hargreaves & Savitch LLP (57) ABSTRACT

The invention provides a tool, device comprising such a tool and a method using such a device for the automated separation of a branch of a plant. The tool comprises a frame, a first separating body, a first displacement unit for moving the first separating body to and fro with respect to the frame between a start position and an end position, and which first separating body is configured for producing a separation in the branch during the move from the start position to the end position. The tool furthermore comprises a pushing element and a second displacement unit for moving the first separating body and the pushing element towards each other and away from each other between an approaching position and a separating position, in which the pushing element and the first separating body are configured for causing a first (Continued)

elongate part of the plant to extend therebetween in the approaching position and for the pushing element to push the first elongate part of the plant in the direction of the separation plane belonging to the first separation body against a side of the first elongate part of the plant facing away from the branch of the plant during displacement of the pushing element in a pushing direction from the approaching position to the separating position.

20 Claims, 5 Drawing Sheets

(56) References Cited

U.S. PATENT DOCUMENTS

| | | | |
|---|---|---|---|
| 2013/0036614 A1* | 2/2013 | Seigneur | A01G 3/08 30/240 |
| 2019/0029178 A1* | 1/2019 | Russel | A01D 46/30 |
| 2020/0008355 A1 | 1/2020 | Nir et al. | |
| 2023/0068237 A1* | 3/2023 | Knopf | B25J 15/10 |

* cited by examiner

TOOL, DEVICE AND PROCEDURE FOR THE AUTOMATED SEPARATION OF A BRANCH

CROSS-REFERENCE TO RELATED APPLICATIONS

This application is US National Stage of International Patent Application PCT/NL2021/050443, filed Jul. 14, 2021, which claims benefit of priority from Dutch Patent Application 2026162, filed Jul. 29, 2020, the contents of both of which are incorporated herein by reference.

The present invention relates to a tool for the automated separation of a second elongate part, such as a petiole, of a plant extending in the form of a branch from a first elongate part, such as a central stem, of the plant, via which first part of the plant, the second part of the plant is connected to roots of the plant, comprising a frame, a first separating body which is provided with a cutting edge, a first displacement unit for moving the first separating body to and fro with respect to the frame between a start position and an end position, in which the cutting edge moves in a separation plane during the move from the start position to the end position and which first separating body is configured to produce a separation in a second elongate part of the plant which extends through the separation plane during the move from the start position to the end position by means of the at least one cutting edge. Such a tool is known from the Netherlands patent NL 2001479 and is described therein in particular by means of FIGS. 4 to 6 thereof. The described tool is fitted on the end of an elongate arm. In use, the tool is manipulated by means of the arm in such a way that a petiole is accommodated in a recess of the tool. Subsequently, this petiole is engaged by two swivelable roller parts in a clamping manner and these roller parts pull on the stalk so that the main stem is pulled towards the tool due to the fact that the petiole is attached to the main stem. By means of a reciprocating blade of the tool, which blade is provided on the side of the roller parts which faces the main stem, the petiole is subsequently cut.

A risk which is inherent to such a tool is the fact that the petiole breaks in an uncontrolled position due to the roller parts pulling thereon. Furthermore, the quality of the operation of the tool depends greatly on the thickness of the petiole and on the slipperiness of the petiole which depends greatly on the atmospheric humidity. Said dependencies also entail the risk that the petiole is separated off at an undesired position. This bears the risk of undesired growth at the position where the petiole was separated.

It is an object of the present invention to provide a tool according to the preamble by means of which it is possible to produce a reliable separation in a second part of a plant, as defined in the introductory paragraph, at a desired position, which desired position is in practice often situated near the first part of the plant. This may be for the purpose of removing leaves of a plant, for example of a tomato plant or a cucumber plant in a greenhouse, or for the purpose of harvesting edible parts of a plant, such as tomatoes or cucumbers. More particularly, it is an object of the invention to provide a tool according to the preamble which can be used with different types of plants. To this end, the invention provides a tool according to the preamble in which the tool furthermore comprises a pushing element and a second displacement unit for moving the first separating body and the pushing element towards and away from each other, between an approaching position and a separating position, in which the pushing element and the first separating body are configured for causing the first elongate part of the plant to extend therebetween in the approaching position and for the pushing element to push the first elongate part of the plant in the direction of the separation plane against a side of the first elongate part of the plant facing away from the second elongate part of the plant during displacement of the pushing element in a pushing direction from the approaching position to the separating position. In this case, a tool according to the invention can be relatively reliable with regard to efficiency due to the fact that, in order to correctly position the second elongate part of the plant so as to produce a separation therein, the first elongate part of the plant is being pushed against instead of the second elongate part of the plant and thus also the first elongate part of the plant is being pulled via this second part. As a result thereof, the operation of the tool, at least with regard to the correct positioning of the second elongate part of the plant in order to produce a separation therein, is independent of the thickness of the second elongate part of the plant and/or of the friction properties thereof.

A good separation in the second elongate part of the plant may be produced in particular if the pushing direction extends perpendicular to the separation plane or at least deviates at most 30 degrees from the direction perpendicular to the separation plane.

A suitable drive mechanism for the first separating body and for the pushing element may be obtained if the tool comprises a first actuator which forms part of the first displacement unit and is preferably designed as a servomotor, and a second actuator which forms part of the second displacement unit and is preferably designed as a servomotor, or in which the tool comprises an actuator which forms part of both the first displacement unit and the second displacement unit and is preferably designed as a common servomotor. Servomotors are outstandingly suitable for electronic actuation by a control unit and are in addition compact. If a common actuator is used and using a suitable transmission, it is possible to, at first, bring about the displacement of the pushing element from the approaching position to the separating position, then the displacement of the first separating body from the start position to the end position and back again to the start position, and finally the displacement of the pushing element from the separating position to the approaching position. Alternatively, the respective displacements of the first separating body and of the pushing element may also overlap each other, optionally partly, for example due to the fact that the displacement of the first separating body from the end position back to the start position and the displacement of the pushing element from the separating position back to the approaching position take place simultaneously, optionally partly. The respective transmission may, for example, comprise a crank mechanism and/or mechanism of rods.

It may furthermore be advantageous if the pushing element comprises at least two push surfaces in order for the pushing element to push against the first elongate part of the plant in at least two different positions during displacement thereof from the approaching position in the pushing direction towards the separating position, in particular if, according to a further possible embodiment, the two push surfaces are configured to push against the first elongate part of the plant on two mutually opposite sides of the second elongate part of the plant, respectively, during displacement by the pushing element from the approaching position to the separating position.

The tool according to one of the preceding claims, wherein the tool comprises a second separating body which is configured to cooperate with the first separating body in order to produce the separation in the second elongate part of the plant. Designing the tool to have a second separating body may increase the reliability with which the separation is produced in the second elongate part of the plant. The second separating body may in this case also be designed to have a cutting edge and the second separating bodies may cooperate with each other, for example in the way a pair of scissors does.

In a further possible embodiment, the second separating body is rigidly connected to the frame. This may benefit structural simplicity of the tool. In addition, it is thus possible to obtain a clear position for the spatial position where the separation is produced in the second elongate part of the plant.

One possible embodiment of the tool according to the invention is characterized by the fact that the second separating body has an anvil surface to which the cutting edge moves during displacement from the start position to the end position. Characteristic of such an anvil surface is the fact that the cutting edge of the first separating body does not pass the anvil surface during displacement of the first separating body from the start position to the end position, but that, in the end position, the cutting edge is situated against the anvil surface or is situated at a close distance thereof, for example less than 1 mm. The separating operation which is then performed by the first separating body could be described as a chopping operation.

For the sake of the structural simplicity of the tool, it may furthermore be preferable if the displacement of the first separating body from the start position to the end position is a pivoting displacement. The first separating body is then connected to the frame so as to be able to pivot to and fro.

For similar reasons, it may be preferable for the displacement of the first separating body and the pushing element from the approaching position to the separating position to be a pivoting displacement. In any case, the pushing element is then pivotably connected to the frame.

In case both the first separating body and the pushing element are pivotably connected to the frame, the respective pivot axes are preferably oriented perpendicular to each other.

In an advantageous embodiment, the tool comprises at least one camera. In this way, it is readily possible to create a clear link between the images recorded by the camera, on the one hand, and the positions of the first separating body and thus of the separation plane and of the pushing element, on the other hand.

From the point of view of the controlled positioning of the first elongate part of the plant immediately before producing a separation in the second elongate part of the plant, it may be preferable for the second displacement unit to be configured to only displace the pushing element with respect to the frame while the first separating body (15a; 33) and the pushing element (17; 51) are being pushed towards each other and away from each other between the approaching position and the separating position. In this way, it is possible to assume with a high degree of certainty that the first elongate part does actually rest against the pushing element in the separating position thereof. In addition, the present embodiment may also offer advantages from a structural point of view due to the reduction in the number of required moving parts of the tool.

The invention furthermore relates to a device for the automated separation of a second elongate part, such as a petiole, of a plant extending as a branch from a first elongate part, such as a central stem, of the plant, via which first part of the plant the second part of the plant is connected to roots of the plant. The device according to the invention comprises a manipulator, a tool according to the invention as described above, which tool is attached to the manipulator for spatial manipulation of the tool, a camera which preferably forms part of the tool, and a control unit which is configured for controlling the manipulator and the first displacement unit and the second displacement unit of the tool on the basis of observations by the camera. Such a device can be used advantageously in the cultivation of plants, in particular in greenhouses.

In particular, but not only when using the device according to the invention in greenhouses, it may be very advantageous if the device comprises a trolley in order to be able to move the manipulator.

In a potentially advantageous embodiment, the manipulator comprises a robot with robot arms which are connected to each other so as to be mutually hingeable. Such robots are available in standard embodiments, which may reduce the cost price of the device. The robots are available, for example, in 4-axle, 5-axle or 6-axle embodiments. In the latter embodiment, it is possible, within working range of the robot, to manipulate the tool in any desired orientation.

The invention furthermore relates to a method for the automated separation of a second elongate part, such as a petiole, of a plant extending in the form of a branch from a first elongate part, such as a central stem, of a plant, via which first part of the plant the second part of the plant is connected to roots of the plant, using a device according to the invention as described above. The method comprises the following steps:

a detecting, by the camera of the device, a second elongate part of a plant which is to be separated and which extends in the form of a branch from a first elongate part of the plant, b controlling, on the basis of the observation by the camera, the manipulator by the control unit of the device in such a way that the second elongate part of the plant extends through the separation plane while the first separating body is in the start position and that the first elongate part of the plant extends between the pushing element and the first separating body in the approaching position of the pushing element and the first separating body, c controlling, after step b, the second displacement unit by the control unit in such a way that the pushing element is moved from the approaching position to the separating position, during which displacement the pushing element the first elongate part of the plant is pushed in the direction of the separation plane by the pushing element, d controlling the first displacement unit by the control unit in such a way that the first separating body is moved from the start position to the end position, during which displacement the first separating body produces a separation in the second elongate part of the plant where the second elongate part of the plant extends through the separation plane, e controlling the first displacement unit by the control unit in such a way that the first separating body is moved from the end position to the start position. The advantages which are associated with the use of such a method will already have become clear to the person skilled in the art after reading the above explanation of the tool and the device according to the invention.

The invention will be explained in more detail below by means of possible embodiments thereof and with reference to the following figures, in which.

Figure 1:
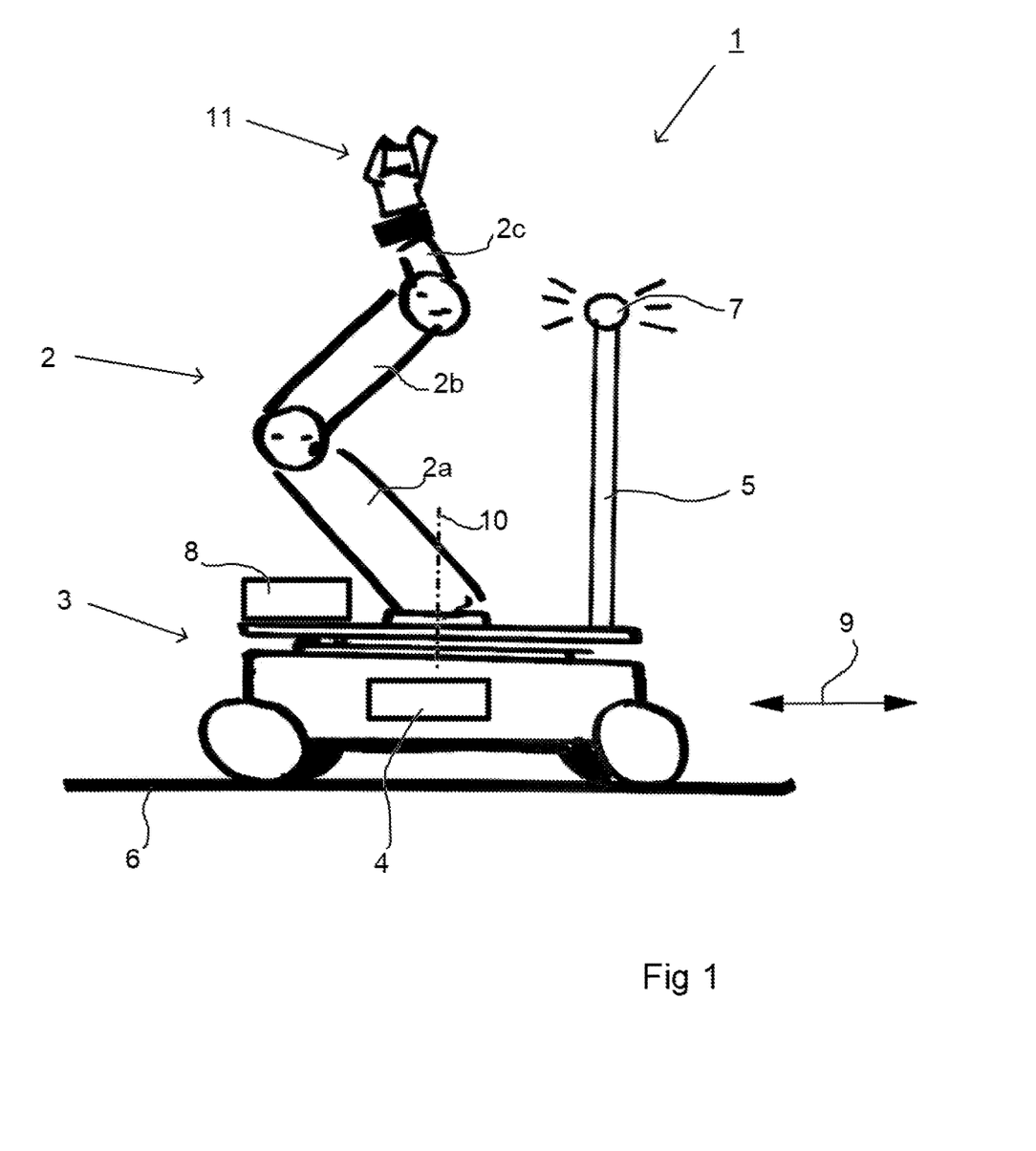
FIG. 1 diagrammatically shows a side view of a device according to the invention.

The automatic leaf-cutting device 1 according to FIG. 1 comprises a 6-axle robot 2 with robot arms 2a to 2c which are hingeably connected to each other and which is placed on a trolley 3 so as to be rotatable about vertical rotation axis 10. The trolley comprises an on-board control unit 4 which, inter alia, controls the robot 2 and which is able to communicate wirelessly with a central control system (not shown in any more detail) by means of antenna 5. Trolley 3 is configured to move, controlled by control unit 4, along rails 6 in the two opposite directions of travel 9 through corridors between rows of plants in greenhouses. The leaf-cutting device 1 is furthermore provided with two cameras 7 which are attached to the antenna 5 and which are directed laterally with respect to directions of travel 9 in order to make visual observations of plants on either side of a corridor. The cameras 7 are connected to control unit 4, so that control unit 4 can control the robot 2, the displacement of the trolley 3 and of the robot 2 on the basis of the observations by cameras 7.

Leaf-cutting device 1 comprises a leaf-cutting tool 11 which will be explained in more detail by reference to FIGS. 2a to 4. The leaf-cutting tool 11 is attached to the end of the free arm of robot 2 and can be manipulated within the working range thereof in any desired orientation by means of robot 2.

Leaf-cutting device 1 furthermore comprises a holder 8 for holding a number of tools, such as for example leaf-cutting tool 11. In this case, consideration may be given to tools of the same type in which the respective tools are alternately and automatically attached to the robot 2. Whereas the tool attached to the robot 2 is active performing its main function, such as separating leaves from the main stem of a plant, the other tool in the holder 8 may for example be cleaned, for example by immersing it in a bath of cleaning liquid which forms part of the holder, or by spraying it with cleaning liquid by means of nozzles in order to reduce the risk of cross-contamination. Holder 8 may also be used to hold tools of a different type, for example not only for holding a leaf-cutting tool, such as leaf-cutting tool 11, but also for holding an automated spray lance which can be attached to the robot 2 to spray plants with.

Figure 2A:
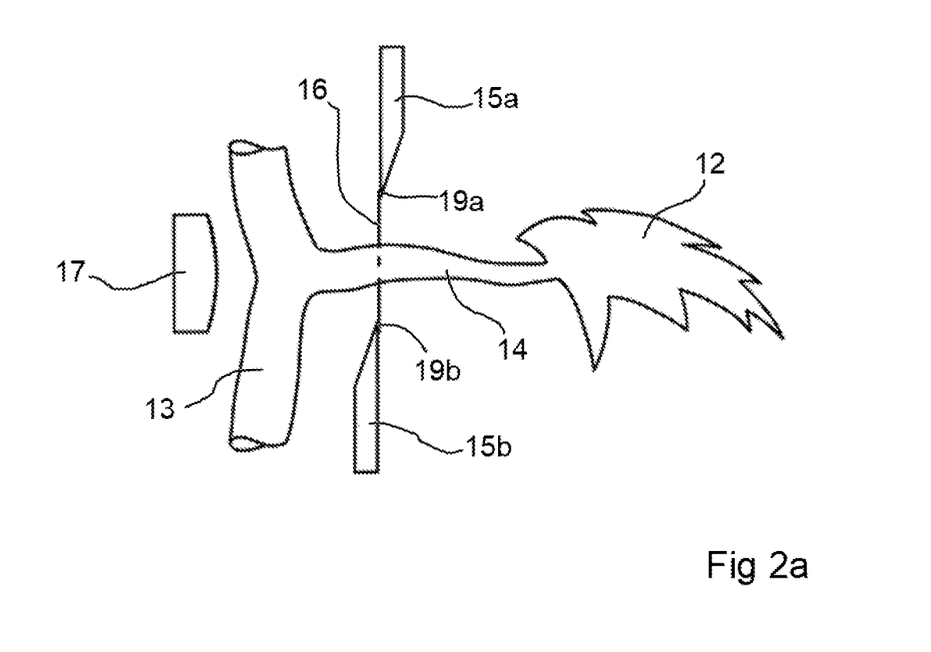
FIGS. 2a to 2c diagrammatically show a side view of three successive stages during the implementation of a method according to the invention.
Figure 2B:
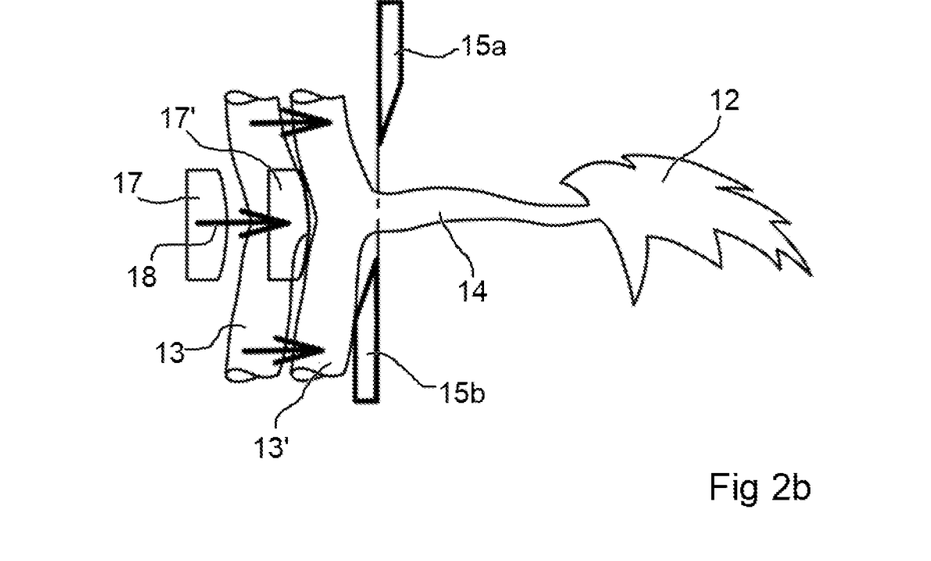
Figure 2C:
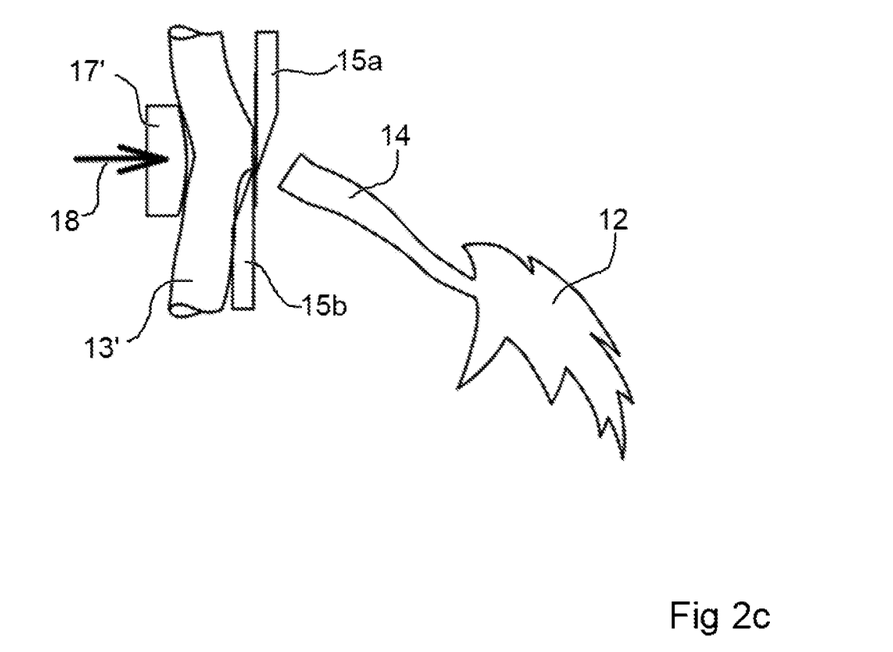

With reference to FIGS. 2a to 2c, leaf-cutting tool 11 is intended to separate leaves 12 of a plant from the main stem 13 of the plant. More specifically, it is best to produce a separation in the stem of the leaf or in the petiole 14, which stem 14 extends from the main stem 13 of the plant and in that sense forms a branch of the main stem 13. From the point of view of cultivation, it is advantageous in this case if the separation is produced close to the main stem 13 without damaging the main stem 13 in the process, as this could result in a disruption in the sap streams in the main stem.

FIGS. 2a to 2c diagrammatically show how the separation process operates or how the leaf-cutting tool works. By means of FIGS. 3 and 4, a concrete embodiment of a leaf-cutting tool 31 will subsequently be described.

The shear blades 15a, 15 are each provided with a respective cutting edge 19a, 19b on the mutually facing sides. As can be seen in FIG. 2a, the leaf-cutting tool 11 is positioned and oriented in such a way with respect to main stem 13 and petiole 14 by means of robot 2, for example on the basis of observations by a camera 7 and controlled by control unit 4, that petiole 14 extends at least substantially perpendicular through the separation plane 16 which is determined by the operational displacements of the two shear blades 15a, 15b of the leaf-cutting tool 11, more specifically by the cutting edges 19a and 19b thereof. The leaf 12 associated with the petiole 14 extends on the side of the shear blades 15a, 15b facing away from the main stem 13. The shear blades 15a, 15 are in an open, start position. When controlling the robot 2, the control unit 4 may also use observations made by one or more cameras which are provided on the leaf-cutting tool 11, in particular for controlling the last stage of the displacement of the leaf-cutting tool 11 by the robot, as will be described below for leaf-cutting tool 31 with reference to FIGS. 3 and 4.

Furthermore, the positioning of the leaf-cutting tool 11 by the robot 2 is thus that the main stem 13 extends between a pushing element 17 of the leaf-cutting tool 11, on the one hand, and the two shear blades 15a, 15b, on the other hand. In this case, the pushing element 17 is situated on the side of the main stem 13 facing away from the petiole 14 exactly against this petiole 14. This mutual position of the pushing element 17 and the shear blades 15a, 15b is referred to by the term approaching position. Once in this position, robot 2 remains stationary until the stage which is described with reference to FIG. 2c has ended. Then, robot 2 will move the leaf-cutting tool 11 to a subsequent leaf which is to be separated.

FIG. 2b shows a next stage in which the pushing element 17 is moved in a pushing direction 18 directed towards the separation plane 16 from the approaching position to the so-called separating position, by means of an actuator (not shown in any more detail in FIGS. 2a to 2c), such as a pneumatic cylinder, a stepper motor, a lifting magnet or a servomotor, of the leaf-cutting tool 11. During this displacement from the approaching position to the separating position, the main stem 13 is pushed in the direction of the separation plane 16, as a result of which the petiole 14 then extends through the separation plane 16 at a position which is closer to the main stem 13. In the separating position, the main stem 13 is retained between the pushing element 17, on the one hand, and the two shear blades 15a, 15b, on the other hand, without a clamping force being applied to the main stem 13 which would damage the latter. In FIGS. 2a and 2b, an accent has been added to the reference numerals 13 and 17 in order to indicate the positions of the main stem 13 and the pushing element 17 in the separating position. The leaf-cutting tool 11 is active during the displacement of the pushing element 17 from the approaching position to the separating position in such a way that the shear blades 15a, 15b do not move in spatial terms.

As can be seen in FIG. 2c, the shear blades 15a, 15b move after the pushing element 17 has assumed the separating position, in this case actuated by an actuator (not shown in any more detail) of the leaf-cutting tool 11, from the start position towards each other to the end position, in which the cutting edges 19a, 19b only just pass each other and as a result of which a cut is made in the petiole 14 at a position close to the main stem 13. In this way, leaf 12 with (the largest part of) the petiole 14 is separated from the main stem 13 by cutting. Subsequently, the shear blades 15a, 15b will be moved apart again, from the end position to the start position, optionally before, during or after the leaf-cutting tool 11 has been moved along to a next position by the robot.

Figure 3:
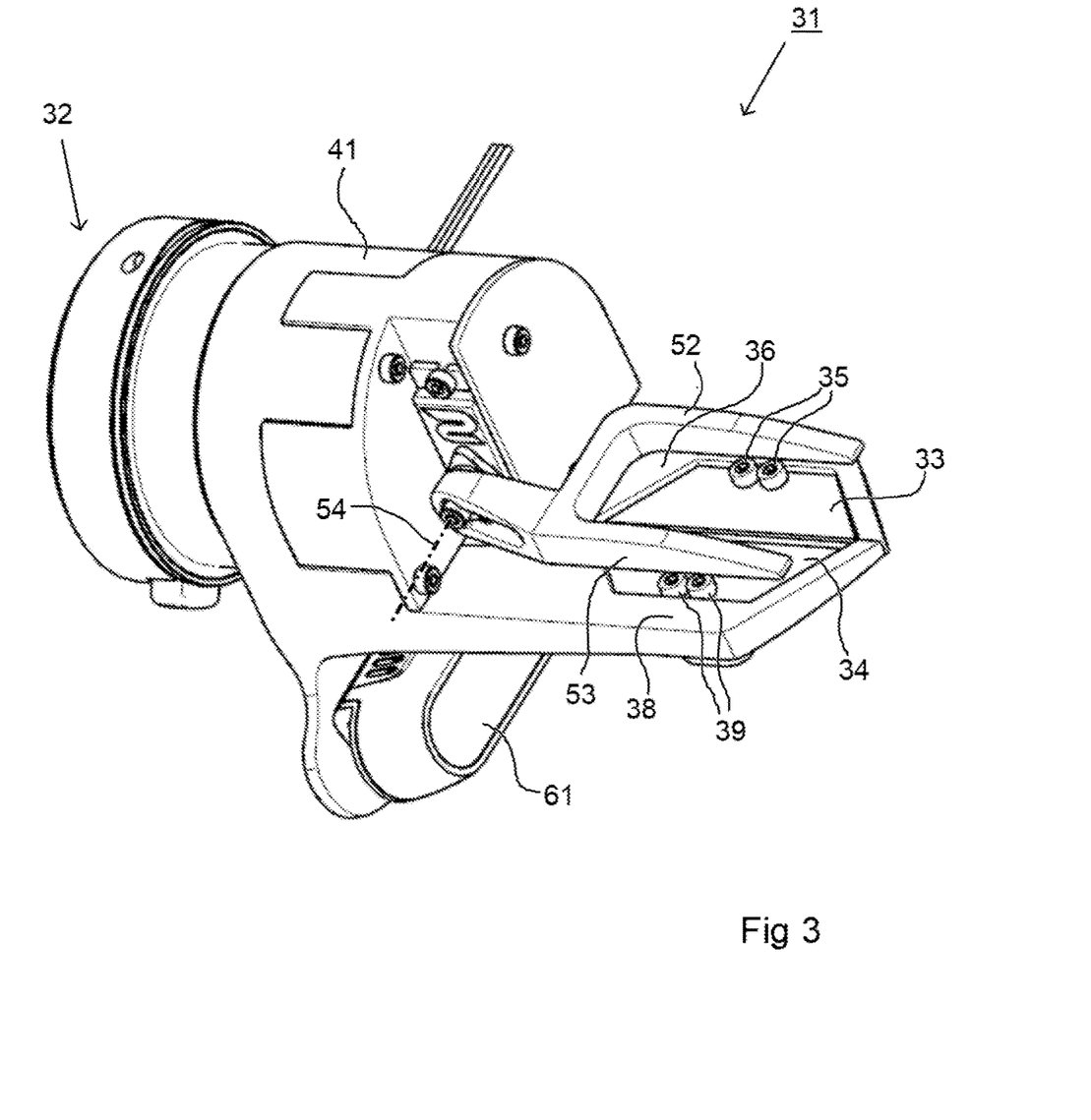
FIGS. 3 and 4 show two different isometric views of a tool according to the invention.
Figure 4:
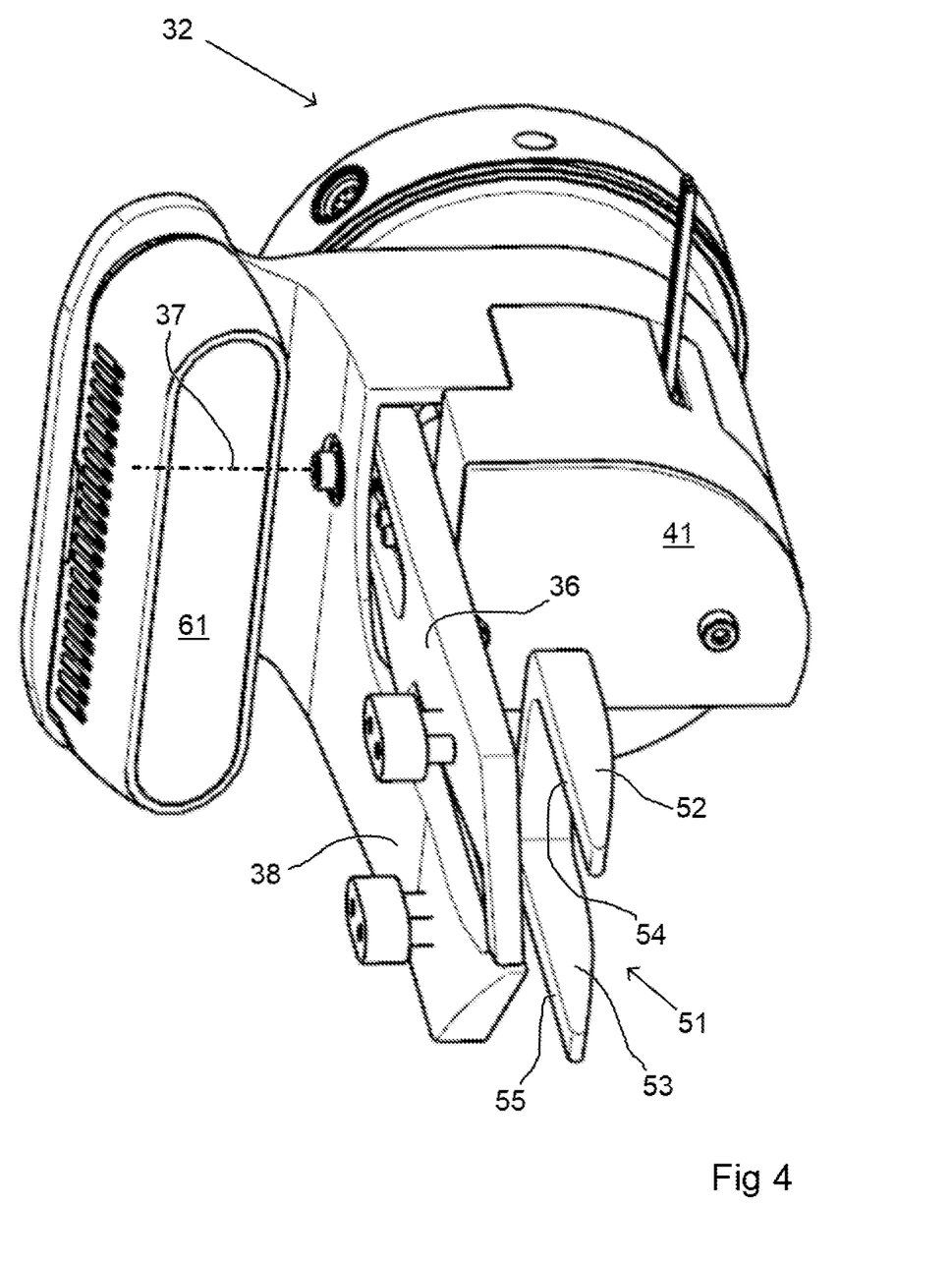

FIGS. 3 and 4 show a concrete exemplary embodiment of a leaf-cutting tool 31. The leaf-cutting tool comprises a frame (not shown in any more detail) to which the various components of the leaf-cutting tool, such as housing 41 which consists of a number of parts, are attached. The frame is configured to be attached to robot 2 with the side which is denoted in FIGS. 3 and 4 by reference numeral 32, so that the leaf-cutting tool 31 can be moved to a desired position and orientation by means of robot 2.

Leaf-cutting tool 31 comprises an at least substantially leaf-shaped first separating body 33 and a second separating body 34.

The first separating body 33 is a Stanley blade which is attached to a holder body 36 by means of bolts 35. The holder body 36 is pivotable to and fro about pivot axis 37 over approximately 45 degrees with respect to the frame between a start position and the end position, as is illustrated in FIGS. 3 and 4. In order to enable the holder body 36 to pivot to and fro, the leaf-cutting tool 31 comprises a servomotor which is provided in the housing 41 and rests on the frame.

The second separating body 34 is also at least substantially leaf-shaped, but does not have a cutting edge, but an anvil surface on the side facing the cutting edge of the first separating body 33. In perpendicular view, the second separating body 34 has the same peripheral shape as the first separating body and is attached to a holder body 38 by means of bolts 39. The holder body forms an integral part of the housing and is therefore rigidly connected to the frame.

Leaf-cutting tool 31 is furthermore provided with a pushing element 51 which is fork-shaped and has two push fingers 52, 53. On the sides facing the two separating bodies 33, 34, the two push fingers 52, 53 have respective push surfaces 54, 55. Pushing element 51 is pivotable to and fro about pivot axis 54 over approximately 45 degrees with respect to the frame of the leaf-cutting tool, between an approaching position and a separating position, as is illustrated in FIGS. 3 and 4. In order to enable the pushing element 51 to pivot to and fro about the pivot axis 54, the leaf-cutting tool comprises a servomotor which is provided in the housing 41 and rests on the frame.

Incidentally, in an alternative embodiment, it is also possible for the leaf-cutting tool to comprise only one servomotor which ensures both that the holder body 36 can pivot to and fro about pivot axis 37 and that the pushing element can pivot to and fro about pivot axis 54.

The pivot axis 54 extends perpendicularly to pivot axis 37. In the separating position, the longitudinal directions of the push fingers 52, 53 extend at least substantially parallel to the cutting edge of the first separating body 33, whereas, in the approaching position, the longitudinal directions of the push fingers 52, 53 enclose an angle of approximately 45 degrees with the longitudinal direction of the aforementioned cutting edge of the first separating body 33. When using the leaf-cutting tool, the push fingers 52, 53 extend perpendicular to the main stem or at least to the first elongate part of a plant, from which a second elongate part (such as a petiole), which extends from the first elongate part of the plant, branches off, in which second elongate part of the plant the leaf-cutting tool 31 is supposed to produce a separation in that second elongate part.

The leaf-cutting tool 31 furthermore comprises a camera system 61 for detecting by means of visual observation a second elongate part of a plant which is to be separated from a first elongate from which the second elongate part branches off. The camera system 61 may be designed, for example, to have different lenses by means of which accurate information can be gained about the spatial position of a petiole to be cut. The camera system is configured to communicate information about its observations to the control unit 4 which, in reaction thereto and for example also in reaction to observations of a camera, such as camera 7 which is provided on trolley 3, first of all controls the robot 2, so that in the situation in which the pushing element 51 is in the approaching position and the two separating bodies are situated in the open start position, the main stem 13 extends between the two push fingers 52, 53, on the one hand, and the two separating bodies 33, 34, on the other hand, in which case the longitudinal direction of the main stem 13 is oriented perpendicular to the longitudinal directions of the push fingers 52, 53 and those of the cutting edge of the first separating body 33 (similar to the situation according to FIG. 2a).

Subsequently, the control unit 2 controls the actuator associated with pushing element 51 to pivot pushing element 51 about pivot axis 54 from the approaching position to the separating position, thereby pushing the main stem 13 in the direction of the two separating bodies 33, 34 and pushing the petiole 14 into the cutting face which is defined by the reciprocating movement of the cutting edge of the first separating body 33 during the pivoting to and fro of the first separating body 33 about pivot axis 37. This results in a situation similar to that of FIG. 2b.

Subsequently, the control unit 2 controls the actuator associated with the first separating body 33 to pivot separating body 33 about pivot axis 37 from the start position to the end position, during which pivoting the cutting edge of the first separating body 33 cuts the petiole 14 at a position which is situated close to the main stem 13. This results in a situation similar to that of FIG. 2c. In the end position, the cutting edge of the first separating body 33 rests against or at least virtually rests against the anvil surface of the second separating body 34.

The invention claimed is:

1. A tool for automated separation of a second elongate part including a petiole, of a plant extending in a form of a branch from a first elongate part including a central stem, of the plant, via which first elongate part of the plant, the second elongate part of the plant is connected to roots of the plant, comprising a frame, a first separating body which is provided with a cutting edge, a first displacement unit for moving the first separating body to and fro with respect to the frame between a start position and an end position, in which the cutting edge moves in a separation plane during the move from the start position to the end position and which first separating body is configured to produce a separation in a second elongate part of the plant which extends through the separation plane during the move from the start position to the end position by at least one cutting edge, characterized in that the tool furthermore comprises a pushing element and a second displacement unit for moving the first separating body and the pushing element towards and away from each other, between an approaching position and a separating position, wherein the second displacement unit is configured to only displace the pushing element with respect to the frame while the first separating body remains stationary during displacement from the approaching position to the separating position, in which the pushing element and the first separating body are configured for causing the first elongate part of the plant to extend therebetween in the approaching position and for the pushing element to physically contact and push the first elongate part of the plant in a direction of the separation plane against a side of the first elongate part of the plant facing away from the second elongate part of the plant during displacement of the pushing element in a pushing direction from the approaching position to the separating position.

2. The tool as claimed in claim 1, wherein the pushing direction extends perpendicular to the separation plane or at least deviates at most 30 degrees from the direction perpendicular to the separation plane.

3. The tool as claimed in claim 1, wherein the tool comprises a first actuator which forms part of the first displacement unit and a second actuator which forms part of the second displacement unit or wherein the tool comprises a common actuator which forms part of both the first displacement unit and of the second displacement unit.

4. The tool as claimed in claim 1, wherein the pushing element comprises at least two push surfaces in order for the pushing element to push against the first elongate part of the plant in at least two different positions during displacement thereof from the approaching position in the pushing direction towards the separating position.

5. The tool as claimed in claim 4, wherein the two push surfaces are configured to push against the first elongate part of the plant on two mutually opposite sides of the second elongate part of the plant, respectively, during displacement by the pushing element from the approaching position to the separating position.

6. The tool according to claim 1, wherein the tool comprises a second separating body which is configured to cooperate with the first separating body in order to produce the separation in the second elongate part of the plant.

7. The tool as claimed in claim 6, wherein the second separating body is rigidly connected to the frame.

8. The tool as claimed in claim 6, wherein the second separating body has an anvil surface to which the cutting edge moves during displacement from the start position to the end position.

9. The tool according to claim 1, wherein the displacement of the first separating body from the start position to the end position is a pivoting displacement.

10. The tool as claimed in claim 9, wherein the first separating body is pivotable about a first pivot axis and the pushing element is pivotable about a second pivot axis, wherein the first pivot axis extends perpendicularly to the second pivot axis.

11. The tool according to claim 1, wherein the displacement of the first separating body and the pushing element from the approaching position to the separating position is a pivoting displacement.

12. The tool according to claim 1, wherein the second displacement unit is configured to only displace the pushing element with respect to the frame while the first separating body and the pushing element are being pushed towards each other and away from each other between the approaching position and the separating position.

13. A device for the automated separation of a second elongate part, including a petiole, of a plant extending as a branch from a first elongate part, including a central stem, of the plant, via which first part of the plant the second part of the plant is connected to roots of the plant, comprising a manipulator, a tool according to claim 1, which tool is attached to the manipulator for spatial manipulation of the tool, a camera which preferably forms part of the tool, and a control unit which is configured for controlling the manipulator and the first displacement unit and the second displacement unit of the tool on a basis of observations by the camera.

14. The device as claimed in claim 13, comprising a trolley in order to be able to move the manipulator.

15. The device as claimed in claim 13, wherein the manipulator comprises a robot with robot arms which are connected to each other so as to be mutually hingeable.

16. A method for the automated separation of a second elongate part, including a petiole, of a plant extending in the form of a branch from a first elongate part, including a central stem, of a plant, via which first part of the plant the second part of the plant is connected to roots of the plant, using a device as claimed in claim 13, comprising the following steps:
  a detecting, by the camera of the device, a second elongate part of a plant which is to be separated and which extends in the form of a branch from a first elongate part of the plant,
  b controlling, on the basis of the observation by the camera, the manipulator by the control unit of the device in such a way that the second elongate part of the plant extends through the separation plane while the first separating body is in the start position and that the first elongate part of the plant extends between the pushing element and the first separating body in the approaching position of the pushing element and the first separating body,
  c controlling, after step b, the second displacement unit by the control unit in such a way that the pushing element is moved from the approaching position to the separating position, during which displacement the pushing element the first elongate part of the plant is pushed in the direction of the separation plane by the pushing element,
  d controlling the first displacement unit by the control unit in such a way that the first separating body is moved from the start position to the end position, during which displacement the first separating body produces a separation in the second elongate part of the plant where the second elongate part of the plant extends through the separation plane,
  e controlling the first displacement unit by the control unit in such a way that the first separating body is moved from the end position to the start position.

17. The tool as claimed in claim 1, wherein the pushing element is fork-shaped and comprises two push fingers, each push finger having a respective push surface.

18. The tool as claimed in claim 17, wherein in the approaching position, longitudinal directions of the push fingers enclose an angle of approximately 45 degrees with a longitudinal direction of the cutting edge of the first separating body.

19. The tool as claimed in claim 1, wherein the first separating body comprises a blade attached to a holder body by bolts.

20. The tool as claimed in claim 1, further comprising a camera system for detecting by visual observation the second elongate part of the plant which is to be separated from the first elongate part from which the second elongate part branches off.

* * * * *